(12) United States Patent  
Lerch et al.

(10) Patent No.: US 11,488,141 B2  
(45) Date of Patent: Nov. 1, 2022

(54) COMMAND-BASED TIMER FOR WIRELESS TRANSACTIONS

(71) Applicant: Apple Inc., Cupertino, CA (US)

(72) Inventors: Matthias Lerch, San Francisco, CA (US); Oren Elrad, San Francisco, CA (US); Ashley Martin, San Jose, CA (US)

(73) Assignee: Apple Inc., Cupertino, CA (US)

( * ) Notice: Subject to any disclaimer, the term of this patent is extended or adjusted under 35 U.S.C. 154(b) by 195 days.

(21) Appl. No.: 15/720,600

(22) Filed: Sep. 29, 2017

(65) Prior Publication Data

US 2019/0102772 A1    Apr. 4, 2019

(51) Int. Cl.
| | |
|---|---|
| *G06Q 20/32* | (2012.01) |
| *H04W 76/38* | (2018.01) |
| *H04W 4/80* | (2018.01) |
| *G06Q 20/40* | (2012.01) |
| *H04L 67/62* | (2022.01) |

(52) U.S. Cl.
CPC ....... *G06Q 20/3278* (2013.01); *G06Q 20/321* (2020.05); *G06Q 20/3263* (2020.05); *G06Q 20/405* (2013.01); *G06Q 20/407* (2013.01); *H04L 67/62* (2022.05); *H04W 4/80* (2018.02); *H04W 76/38* (2018.02)

(58) Field of Classification Search
CPC .... G06Q 20/3278; H04W 76/38; H04W 4/80; H04L 67/325
USPC .......................................................... 705/17
See application file for complete search history.

(56) References Cited

U.S. PATENT DOCUMENTS

| 5,761,444 A * | 6/1998 | Ajanovic | ............... G06F 13/362 |
| | | | 710/100 |
| 9,552,584 B1 * | 1/2017 | Bierbaum | ............ G06Q 20/127 |
| 10,055,721 B1 * | 8/2018 | Mocko | ................... G06Q 20/20 |
| 2008/0162361 A1 * | 7/2008 | Sklovsky | ............... G06Q 20/32 |
| | | | 705/65 |
| 2008/0277482 A1 * | 11/2008 | Parlange | ........... G06K 19/0723 |
| | | | 235/492 |

(Continued)

FOREIGN PATENT DOCUMENTS

EP           2940882 A1 * 11/2015    ........... H04B 5/0056

*Primary Examiner* — Luna Champagne
(74) *Attorney, Agent, or Firm* — Sterne, Kessler, Goldstein & Fox P.L.L.C.

(57) ABSTRACT

Embodiments for providing a timely indication that a wireless transaction has been completed, using a command-based timer solution, are provided. These embodiments include receiving a first command, associated with the wireless transaction, from a reader; initiating, using an applet, a first command-based timer when the first command is received; issuing, using the applet, an activity timeout signal when the first command-based timer expires before a second command is received from the reader; and providing an indication that the wireless transaction has been completed in response to the activity timeout signal. In some embodiments, the command-based timer solution may also include canceling, using the applet, the first command-based timer when the second command is received before the first command-based timer expires; initiating a second command-based timer when the second command is received; and issuing the activity timeout signal when that the second command-based timer expires.

18 Claims, 4 Drawing Sheets

(56) References Cited

U.S. PATENT DOCUMENTS

| | | | |
|---|---|---|---|
| 2013/0317924 A1* | 11/2013 | Bush | G06Q 20/3278 |
| | | | 705/16 |
| 2013/0320080 A1* | 12/2013 | Olson | G07F 7/0833 |
| | | | 235/380 |
| 2015/0347328 A1* | 12/2015 | Dominguez | G06F 9/544 |
| | | | 710/267 |
| 2016/0183032 A1* | 6/2016 | Pogorelik | H04W 12/04 |
| | | | 455/41.1 |
| 2016/0364730 A1* | 12/2016 | Rans | G06Q 20/40145 |
| 2017/0178103 A1* | 6/2017 | Peri | G06Q 20/322 |

* cited by examiner

COMMAND-BASED TIMER FOR WIRELESS TRANSACTIONS

BACKGROUND

Field

This disclosure generally relates to wireless transactions, such as near-field communication (NFC) transactions.

Related Art

Consumer electronic devices are an important part of people's everyday lives. These electronic devices include everything from cellphones, laptops, tablets, and smartwatches to televisions, digital assistants, and other home appliances. Many consumer electronic devices have been adapted to include wireless communication capabilities, such that these devices can communicate and coordinate with one another, as well as with wireless access points and wireless readers/terminals. One such wireless communication capability that has been integrated into these wirelessly-enabled devices is near-field communication (NFC) technology. As just one example, NFC technology, when incorporated into a wirelessly-enabled electronic device, can be used to conduct daily transactions, such as payment transactions and transit transactions.

SUMMARY

The present disclosure provides system, apparatus, method, and computer program product embodiments, and combinations and sub-combinations thereof, for implementing command-based timer solutions to help reduce unnecessary delays and/or incomplete transactions that may be caused by near-field communication (NFC)-enabled devices unable to accurately determine when a desired transaction has been completed.

During an NFC transaction, an NFC interface of an NFC-enabled device may remain active for an indeterminate period of time, which may therefore delay the timely presentation of a result (e.g., a transaction completion indication), e.g., to notify a user. Embodiments of the NFC-enabled devices disclosed herein may implement a command-based timer solution to limit the period of time over which the NFC interface remains active following a successful completion of a transaction. In some embodiments, a command-based timer may be initiated once the NFC-enabled device receives a command from a reader/terminal. The command-based timer may then proceed until one of two events occur: (i) the timer expires; or (ii) another command is received by the NFC-enabled device from the reader/terminal. If another command is received before the timer expires, the current timer is canceled, and a new timer is initiated. If, however, the timer expires without another command being received by the NFC-enabled device, the NFC-enabled device may provide the user with an indication that the transaction has been completed.

Additionally, following the expiration of the timer, the NFC-enabled device may deactivate the NFC interface. A deactivation of the NFC interface may also correspond to one or more different actions, such as turning off an NFC radio of the NFC-enabled device.

In some embodiments, the duration of the timer may depend on the type of command executed and/or the type of data associated with that command.

The command-based timer solutions disclosed herein provide multiple advantages, including any/all of: (i) reducing delays associated with NFC transactions; (ii) reducing the likelihood of incomplete NFC transactions; and (iii) avoiding expensive (or impractical) modifications to existing readers/terminals.

Although the embodiments disclosed herein are discussed in the context of NFC transactions, and specifically NFC transactions taking place in a transit system, this disclosure is not so limited. Instead, the command-based timer solutions disclosed herein may be equally applicable to any other type(s) of wireless technologies, such as, without limitation, Wi-Fi, cellular, Bluetooth, radio-frequency identification (RFID), as well as several different types of wireless systems, including payment systems, ticketing systems, package delivery systems, and product inventory checking systems.

BRIEF DESCRIPTION OF THE DRAWINGS/FIGURES

Embodiments of the disclosure are described with reference to the accompanying drawings. In the drawings, generally, like reference numbers indicate identical or functionally similar elements. Additionally, generally, the left most digit(s) of a reference number identifies the drawing in which the reference number first appears.

DETAILED DESCRIPTION

Figure 1:
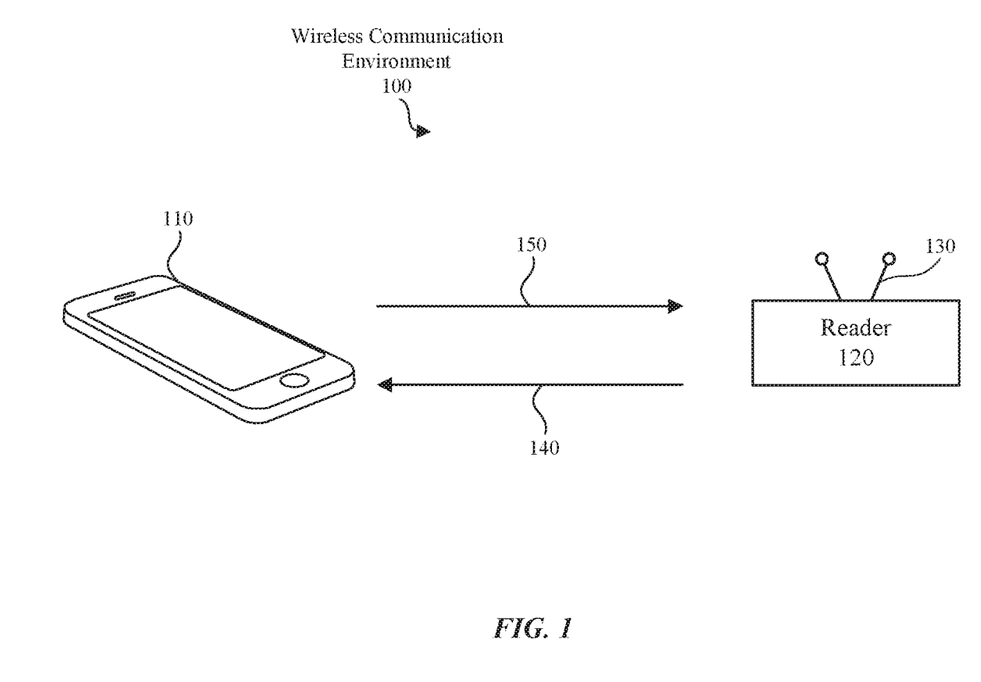
FIG. 1 illustrates a diagram of an exemplary wireless communication environment, according to some embodiments.

FIG. 1 illustrates a diagram of an exemplary wireless communication environment according to some embodiments. A wireless communication environment 100 provides wireless communication of information, such as one or more commands and/or data, between a wirelessly-enabled device 110 and a reader (or terminal) 120. In some embodiments, wirelessly-enabled device 110 and reader 120 may be configured to communicate using near-field communication (NFC) technology, such that one or more commands and/or data can be exchanged when wirelessly-enabled device 110 and reader 120 are sufficiently proximate to each other. In some embodiments, wirelessly-enabled device 110 and reader 120 may communicate using NFC technology when the devices are within approximately 20 cm of each other, however, other ranges may also be possible without departing from the spirit and scope of the present invention. Wirelessly-enabled device 110 is also referred to herein as "NFC-enabled device 110."

NFC is a wireless communication technology that, when incorporated into a wirelessly-enabled electronic device, can be used to conduct transactions such as, for example, payment transactions and transit transactions. For example, instead of carrying physical credit cards, the credit information provided by these credit cards could be stored on an NFC-enabled electronic device (e.g., NFC-enabled device 110). The NFC-enabled electronic device can be positioned close (e.g., within near field range) to a credit card reader/terminal to relay the credit information to the reader/terminal to complete a transaction. As another example, a ticketing system, such as those used in a bus, train, subway, or ferry terminal, may write (or deduct) ticket fare information onto (or from) the NFC-enabled electronic device instead of having to provide (or collect) a physical ticket. Again, a user can position the NFC-enabled electronic device close (e.g., within near field range) to a reader/terminal to gain access to the bus, train, subway, or ferry without the use of a paper ticket.

The NFC-enabled electronic device (e.g., NFC-enabled device 110) can be positioned within a relatively small distance from an NFC reader/terminal (e.g., reader 120) so that their corresponding fields can exchange information. In some cases, the NFC reader/terminal transmits or generates a field modulated with certain information such as, for example, credit information or ticket fare information. This field inductively couples the information onto the NFC-enabled electronic device that is proximate to the reader/terminal. The information transmitted by the NFC reader/terminal may be received by an antenna of the NFC-enabled electronic device. The NFC-enabled electronic device may respond to the reader/terminal by inductively coupling its corresponding information onto an antenna of the reader/terminal.

Those skilled in the relevant art(s) will recognize that NFC-enabled device 110 may be configured to communicate using other wireless communication protocols (either near field or far field communications) without departing from the spirit and scope of the present disclosure. For example, although the present disclosure is to be described using NFC-enabled devices, those skilled in the relevant art(s) will recognize that certain functions of NFC-enabled device 110 may be performed using other communication protocols, such as Wi-Fi, Bluetooth, radio-frequency identification (RFID), cellular communication, or the like.

In referring to FIG. 1, in some embodiments, NFC-enabled device 110 may be implemented as a standalone device, a discrete device, or may be incorporated within or coupled to another electrical device or host device, which include, for example, (i) a cellphone, (ii) a portable computing device, (iii) a camera, (iv) a Global Positioning System (GPS) unit, (v) a smartwatch or other wearable device, or (vi) another computing device such as a personal digital assistant, a video gaming device, a laptop, a tablet, or a computer peripheral (e.g., a portable audio and/or video player). Additionally, NFC-enabled device 110 and reader 120 may be implemented in, for example, (i) a payment system, (ii) a ticketing writing system such as a parking ticketing system, (iii) a bus ticketing system, (iv) a train ticketing system, (v) an entrance ticketing system, (vi) a ticket reading system, (vii) a package delivery system, (viii) a product inventory checking system, (ix) and/or any other suitable wireless system that will be apparent to those skilled in the relevant art(s) without departing from the spirit and scope of the disclosure.

In some embodiments, NFC-enabled device 110 and reader 120 may interact with each other to exchange information in a peer-to-peer (P2P) communication mode or a reader/writer (R/W) communication mode. In the P2P communication mode, NFC-enabled device 110 and reader 120 may be configured to operate according to an active communication mode and/or a passive communication mode. For example, reader 120 may modulate its corresponding information onto a first carrier wave, referred to as a "modulated information communication," and may generate a first field by applying the modulated information communication to a first antenna 130 to provide a first information communication signal 140. Reader 120 may cease to generate the first field after transferring its corresponding information to NFC-enabled device 110 in the active communication mode. Alternatively, in the passive communication mode, reader 120 continues to apply the first carrier wave without its corresponding information, referred to as an "unmodulated information communication," to continue to provide first information communication signal 140 once the information has been transferred to NFC-enabled device 110.

Reader 120 may be sufficiently proximate to NFC-enabled device 110 such that first information communication signal 140 is inductively coupled onto a second antenna (not shown in FIG. 1) of NFC-enabled device 110. NFC-enabled device 110 may then demodulate first information communication signal 140 to recover the information. NFC-enabled device 110 may respond to the information by modulating its corresponding information onto a second carrier wave and generating a second field by applying this modulated information communication to the second antenna to provide a second information communication signal 150 in the active communication mode. Alternatively, NFC-enabled device 110 may respond to the information by modulating the second antenna with its corresponding information to modulate the first carrier wave to provide second information communication signal 150 in the passive communication mode.

Additionally, or alternatively, when operating in the R/W communication mode, reader 120 may be configured to function in an initiator mode of operation, and NFC-enabled device 110 may be configured to operate in a target, or tag, mode of operation. However, this example is not limiting. Those skilled in the relevant art(s) will recognize that reader 120 may be configured to operate in the tag mode and NFC-enabled device 110 may be configured to operate in the initiator mode in accordance with the teachings herein without departing from the spirit and scope of the present disclosure. While operating in the R/W communication mode, reader 120 may be configured to modulate its corresponding information onto the first carrier wave and generate the first field by applying the modulated information communication to first antenna 130 to provide first information communication signal 140. The reader 120 may continue to apply the first carrier wave without its corresponding information to continue to provide first information communication signal 140 once the information has been transferred to NFC-enabled device 110. Again, reader 120 may be sufficiently proximate to NFC-enabled device 110 such that first information communication signal 140 is inductively coupled onto a second antenna of NFC-enabled device 110.

NFC-enabled device 110 may derive or harvest power from first information communication signal 140 to recover and/or process the received information, and/or to provide a response to the information. NFC-enabled device 110 may then demodulate first information communication signal 140 to recover and/or to process the information. NFC-enabled device 110 may respond to the information by modulating the second antenna with its corresponding information to modulate the first carrier wave to provide second information communication signal 150.

In some embodiments, NFC-enabled device 110 may have an applet installed on the device. As will become apparent to those skilled in the relevant art(s), the applet may be an application configured to perform a specific task, or tasks, and the applet may be configured to run within the scope of a larger program. For example, when the applet is installed on NFC-enabled device 110, the applet may be responsible for processing read/write commands issued by reader 120. In some embodiments, the applet may retrieve information from a memory (shown in FIG. 4) in response to a read command, and may write/update information stored in the memory in response to a write command. Additionally, in some embodiments, the applet may provide the retrieved information to an application processor (shown in FIG. 4) of NFC-enabled device 110, such that the information can be modulated and communicated back to reader 120.

Further example operations of NFC-enabled device 110 and/or reader 120 may be described in International Standard ISO/IE 18092:2004(E), "Information Technology-Telecommunications and Information Exchange Between Systems-Near Field Communication-Interface and Protocol (NFCIP-1)," published on Apr. 1, 2004 and International Standard ISO/IE 21481:2005(E), "Information Technology-Telecommunications and Information Exchange Between Systems-Near Field Communication-Interface and Protocol-2 (NFCIP-2)," published on Jan. 15, 2005, each of which is incorporated by reference herein in its entirety.

As an illustrative example, NFC-enabled device 110 and reader 120 may be implemented in a transit system for reading and/or writing ticket information. For example, reader 120 may represent a ticketing kiosk at a train station, while NFC-enabled device 110 may represent a user's mobile device. In such a scenario, when the user has a transit account stored on NFC-enabled device 110, the user may use NFC-enabled device 110 in place of a physical ticket to gain access, e.g., to a desired train, platform, etc. Again, this example is not limiting, and it should be understood that NFC-enabled device 110 and reader 120 may communicate in other wireless systems (as discussed previously herein) without departing from the spirit and scope of the present disclosure. Nonetheless, when implemented in a transit system, wireless communication may be initiated between NFC-enabled device 110 and reader 120 when NFC-enabled device 110 is positioned sufficiently proximate (e.g., within 20 cm) to reader 120.

Reader 120 may issue a first read command, via signal 140, instructing NFC-enabled device 110 to retrieve the user's transit account balance. In some embodiments, the first read command may include a memory address of where the requested transit account balance is stored in NFC-enabled device 110. For example, the first read command may indicate a specific file, as well as a specific portion of that file (e.g., data stored over a specific byte range) that is to be retrieved. Upon receipt of the first read command, via signal 140, an applet installed on NFC-enabled device 110 may retrieve the requested balance information from the appropriate location in memory.

The applet may provide the balance information to an application processor (shown in FIG. 4) of NFC-enabled device 110, such that the information can be modulated and communicated back to reader 120, via signal 150. In some embodiments, each command issued by reader 120 may include one round-trip communication—e.g., transmitting the first read command, via signal 140, and receiving the requested balance information, via signal 150.

After receiving the user's transit account balance, reader 120 may then issue a write command, via signal 140, instructing NFC-enabled device 110 to write a new transit account balance to memory in place of the old transit account balance (e.g., an electronic wallet update command). For example, the new transit account balance may represent the user's old transit account balance minus the cost of a train ticket.

Reader 120 may additionally issue a second read command, via signal 140, instructing NFC-enabled device 110 to retrieve the user's new transit account balance. In some embodiments, the second read command may be issued in order to ensure that the user's transit account balance has been updated correctly. Upon receipt of the second read command, the applet installed on NFC-enabled device 110 may retrieve the requested balance information from the appropriate location in memory. The applet may then provide the updated balance information to the application processor such that the information can be modulated and communicated back to reader 120, via signal 150.

In this illustrative example, the train ticket purchasing transaction is complete once reader 120 receives and verifies the user's updated transit account balance. However, NFC-enabled device 110 may not know that the second read command issued by reader 120 is the last command of the transaction.

As discussed previously, the applet installed on NFC-enabled device 110 may be responsible for processing the read/write commands issued by reader 120. Yet, the applet, and thus NFC-enabled device 110, may only know the location of the information that is to be retrieved/updated, and may not know the specific context of that information. For example, with respect to the second read command issued by reader 120, the applet may know the address of the requested information and may also know the numerical value stored at that address. But, the applet may not know that the retrieved numerical value is the user's updated transit account balance. As such, the applet, and thus NFC-enabled device 110, may not know that the user's prior transit account balance has already been read and processed for payment (e.g., the price of the train ticket deducted from the account balance).

The above scenario meant that an NFC-enabled device would not be capable of providing a timely and accurate indication to the user that the ticket purchasing transaction has been completed. For example, in some cases, a reader may be configured to maintain its RF switch ON, which may impede the NFC-enabled device's ability to provide an indication of a completed transaction to the user. In such cases, the indication of a completed transaction may only be displayed once an NFC-enabled device has moved out of near-field range of the reader. Thus, the inability to timely and accurately provide the indication of a completed transaction to the user could result in unnecessary delays (e.g., if an indication of a completed transaction is not given to the user until sometime after the transaction is completed) or incomplete transactions (e.g., if an indication of a completed transaction is provided to the user before the transaction is completed, thereby causing the user to prematurely move the NFC-enabled device out of near field range). Moreover, leaving the RF switch ON in the NFC-enabled device may also cause power consumption issues.

Embodiments of NFC-enabled device 110 provided herein address these drawbacks by implementing one or more command-based timers during NFC transactions between NFC-enabled device 110 and reader 120. The command-based timers can be implemented during any transaction, including the exemplary train ticket purchasing transaction discussed above. One purpose of these command-based timers, among others, is to set an allotment of time (e.g., a maximum allotment of time) that NFC-enabled device 110 waits before providing an indication that the transaction has been completed.

For example, upon receipt of a first command from reader 120, the applet installed on NFC-enabled device 110 may initiate a first command-based timer. If a second command is received prior to the expiration of the first command-based timer, then the applet cancels the first timer and begins a second timer substantially concurrently with the receipt of the second command. If, however, the first timer expires before a second command is received, then the applet installed on NFC-enabled device 110 may issue an activity timeout signal to the application processor, according to some embodiments. Upon receipt of the activity timeout signal, the application processor may provide an indication that the transaction has been completed. Additionally, the applet may instruct the application processor to deactivate an NFC interface in NFC-enabled device 110 (not shown in FIG. 1) upon expiration of the first timer. The deactivation of the NFC interface may also correspond to one or more different actions such as, for example, turning off an NFC radio included in NFC-enabled device 110 (shown in FIG. 4).

In some embodiments, it may be advantageous to implement the command-based timer solutions in the applet installed on NFC-enabled device 110 to avoid modifying reader 120. Modifications to reader 120 may be difficult (or impractical) due to the number of readers implemented throughout multiple regions and different types of readers that operate according to different functionality and different file storage definitions. A reader implemented in a train station in New York, for example, may be configured to operate differently than a reader implemented in a train station in Tokyo. For example, a New York-based reader may operate under the assumption that the user's account balance is to be stored in a device's memory, e.g., at file 3, bytes 5-9, whereas a Tokyo-based reader may operate under the assumption that the user's account balance is to be stored in a device's memory, e.g., at file 5, bytes 9-13. Moreover, implementing the disclosed command-based timer solutions in the applet installed on NFC-enabled device 110 may also avoid having to account for the different lengths of time to complete a command when using different service providers. For example, implementing these command-based timer solutions in the applet, instead of in an operating system of NFC-enabled device 110, may eliminate, for example, the need for service provider-specific code.

In some embodiments, the indication of a completed transaction may be provided as a visual indication on the display of NFC-enabled device 110, such as by a checkmark and/or text. The indication may also be provided as an audio indication using NFC-enabled device 110's speaker(s) (not shown in FIG. 1), and/or as a vibration indication using NFC-enabled device 110's vibration functionality (haptic feedback mechanism). Additionally or alternatively, the indication of a completed transaction may be represented by a combination of a visual, audio, and/or vibration indications.

Figure 2:
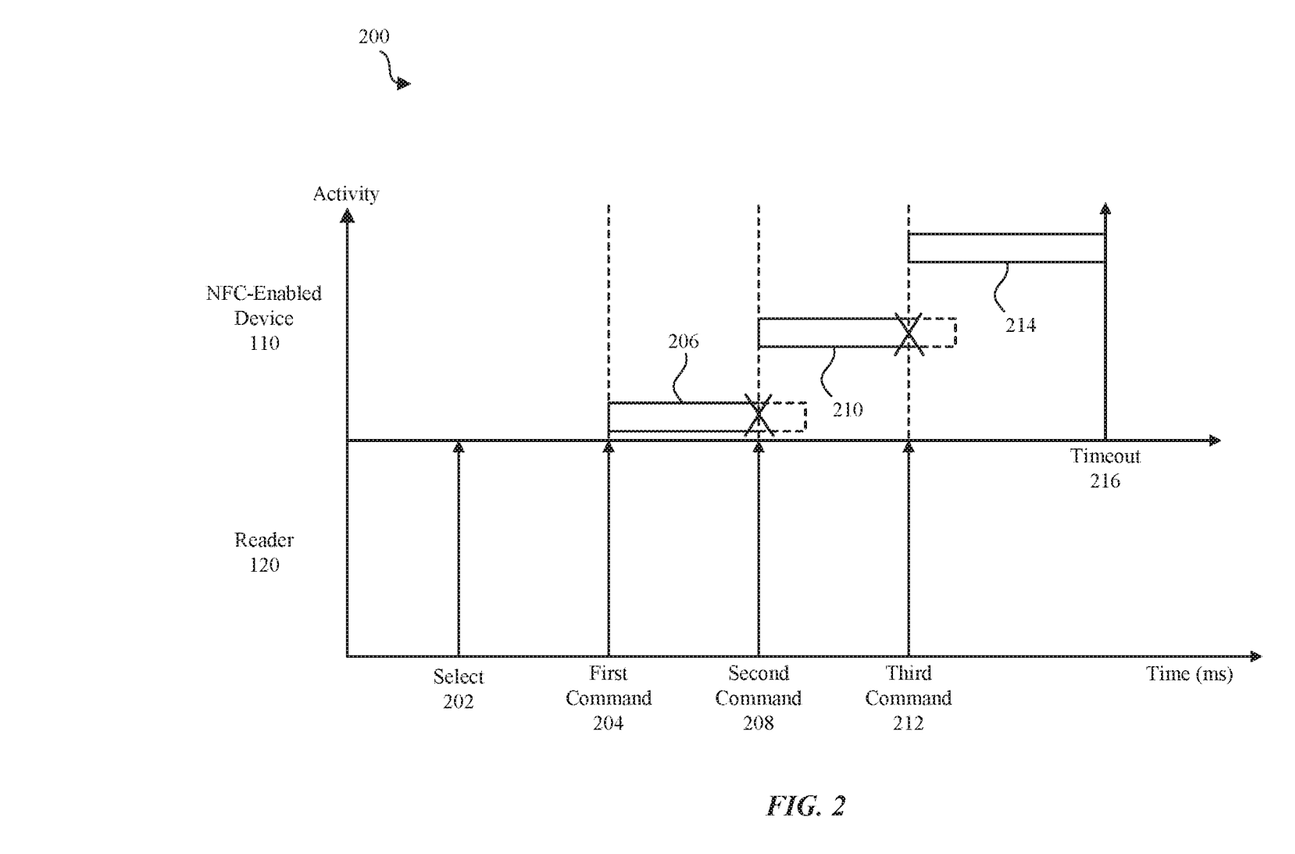
FIG. 2 illustrates an exemplary implementation of a command-based timer solution, according to some embodiments.

FIG. 2 illustrates an exemplary implementation of a command-based timer solution 200, according to some embodiments. For illustrative purposes, the exemplary command-based timer solution 200 of FIG. 2 is described with reference to embodiments of FIG. 1. However, command-based timer solution 200 is not limited to these embodiments.

As discussed above, NFC-enabled device 110 may implement command-based timer solution 200 in order to reduce unnecessary delays and/or incomplete transactions that may be caused when NFC-enabled devices are unable to provide a timely and accurate indication of a completed transaction. In some embodiments, command-based timer solution 200 may begin when a user positions NFC-enabled device 110 sufficiently proximate to reader 120 in an attempt to perform a mobile transaction, such as purchasing a train ticket, for example. Once NFC-enabled device 110 is sufficiently proximate to reader 120, reader 120 may issue a "select" command 202 that instructs an applet installed on NFC-enabled device 110 to begin processing commands issued by reader 120 during the course of the transaction. Subsequently, reader 120 may issue a first command 204. As discussed above, first command 204 may represent a first read command instructing NFC-enabled device 110 to retrieve, e.g., the user's transit account balance.

Upon receipt of first command 204, the applet installed on NFC-enabled device 110 may initiate a first timer 206, according to some embodiments. First timer 206 may have any number of different values. For example, first timer 206 may represent a default timer. In some embodiments, the default timer may be set to approximately 250 milliseconds. Alternatively, first timer 206 may represent a user-defined timer. In some embodiments, the user may set first timer 206 to have a value between approximately 100 milliseconds and approximately 500 milliseconds. However, as will become apparent to those skilled in the relevant art(s), other values are also possible without departing from the spirit and scope of the present disclosure.

Additionally, or alternatively, first timer 206 may vary based on the specific type of command issued by reader 120, according to some embodiments. For example, data encryption commands and device/user authentication commands may be more processor intensive than a read command directed to reading a user's account balance. Therefore, first timer 206 may be set to a relatively higher value when first command 204 is an encryption command or an authentication command and may alternatively be set to a relatively lower value when first command 204 is a read command.

Moreover, in some embodiments, the commands that may be issued by reader 120 during the course of a transaction may be grouped into different categories, where a first category may include read commands (relatively less processor intensive), and a second category may include write commands (relatively more processor intensive). In such instances, first timer 206 may be set to a relatively higher value when first command 204 is a write command, and may alternatively be set to a relatively lower value when first command 204 is a read command.

Further, in some embodiments, first timer 206 may vary based on the type of data associated with the command. For example, it may take longer for NFC-enabled device 110's application processor (shown in FIG. 4) to modulate and communicate back to reader 120 relatively large amounts of data and/or data that is encrypted. Similarly, it may take reader 120 longer to process the large amounts of data and/or data that is encrypted. In such instances, reader 120 may take longer to issue the next command in the transaction sequence. Therefore, first timer 206 may be set to a relatively higher value when first command 204 requests a large amount of data and/or encrypted data and may alternatively be set to a relatively lower value when first command 204 requests a small amount of unencrypted data.

In some embodiments, the user may be able to change the value of first timer 206 using a graphical user interface (GUI) of the applet installed on NFC-enabled device 110. Further, the value of first timer 206 may be changed using a backend server that may be responsible for managing the applet for a specific service provider or region.

Additionally, or alternatively, the applet may be capable of automatically adjusting first timer 206 based on the type of command and/or the type of data associated with first command 204, according to some embodiments. For example, the applet may store a table that may correlate specific commands, and/or specific types of data, with the time that it takes for NFC-enabled device 110 and reader 120 to perform the processing needed to complete first command 204. Upon receipt of first command 204, the applet may reference the table to determine the appropriate value for first timer 206. For example, a read command may take approximately 100 milliseconds to complete, and a write command may take approximately 150 milliseconds to complete.

NFC-enabled device 110 may be configured to populate the table stored in the applet with appropriate processing times by analyzing the behavior of reader 120 over a period of time, according to some embodiments. For example, NFC-enabled device 110 may perform a scanning technique to determine an amount of time between the issuance of sequential commands by reader 120.

In some embodiments, first timer 206 may be set to a minimum value sufficient to complete the desired command(s). For example, if NFC-enabled device 110 is tasked with processing multiple commands, first timer 206 may be set to a value (e.g., a minimum value) sufficient to allow NFC-enabled device 110 to complete the most processor-intensive command out of the multiple commands.

Moreover, in some embodiments, first timer 206 may include a certain amount of "buffer" time in addition to the length of time that it may take for NFC-enabled device 110 and reader 120 to perform the processing needed to complete first command 204. For example, when first command 204 represents a write command (e.g., 150 milliseconds), first timer 206 may be set to include approximately 30 milliseconds of buffer time, in which case, first timer 206 may be set to approximately 180 milliseconds. However, as will become apparent to those skilled in the relevant art(s), other values are also possible without departing from the spirit and scope of the present disclosure.

A purpose of including buffer time in first timer 206, among others, is to provide reader 120 with some leeway in issuing its next command. For example, if no buffer time was included, a delay in issuing the next command (e.g., 1 millisecond) could potentially cause NFC-enabled device 110 to prematurely provide an indication to the user that the transaction has been completed, even though additional commands may still need to be processed. In other words, adding buffer time to first timer 206 helps ensure that premature transaction completion indications are not presented to the user, which will thereby also help ensure that the user does not inadvertently move NFC-enabled device 110 out of near field range of reader 120 before the transaction is completed.

Returning to FIG. 2, after initiating first timer 206, the applet installed on NFC-enabled device 110 may wait to see if another command is issued by reader 120. If reader 120 issues a second command 208 before first timer 206 expires (as shown in FIG. 2), then first timer 206 is canceled and a second timer 210 is initiated. If, however, reader 120 does not issue another command before first timer 206 expires (not shown in FIG. 2), then the applet may assume that the transaction is complete and may present a corresponding indication that is perceivable by a user once first timer 206 expires. Additionally, the applet may instruct the application processor to deactivate an NFC interface of NFC-enabled device 110 upon expiration of first timer 206. A deactivation of the NFC interface may also correspond to one or more different actions such as, for example, turning off an NFC radio of NFC-enabled device 110 (shown in FIG. 4).

In some embodiments, second timer 210 may be set to have the same value as first timer 206. Alternatively, in some embodiments, second timer 210 may be set to have a different value than first timer 206. For example, second timer 210 may be set based on the type of command and/or the type of data associated with second command 208. As discussed above, second command 208 may represent a write command instructing NFC-enabled device 110 to write a new transit account balance to memory in place of the old transit account balance. Accordingly, second timer 210 (which is associated with a relatively more processor-intensive write command) may be set to a relatively higher value than first timer 206 (which is associated with a relatively less processor-intensive read command).

Figure 4:
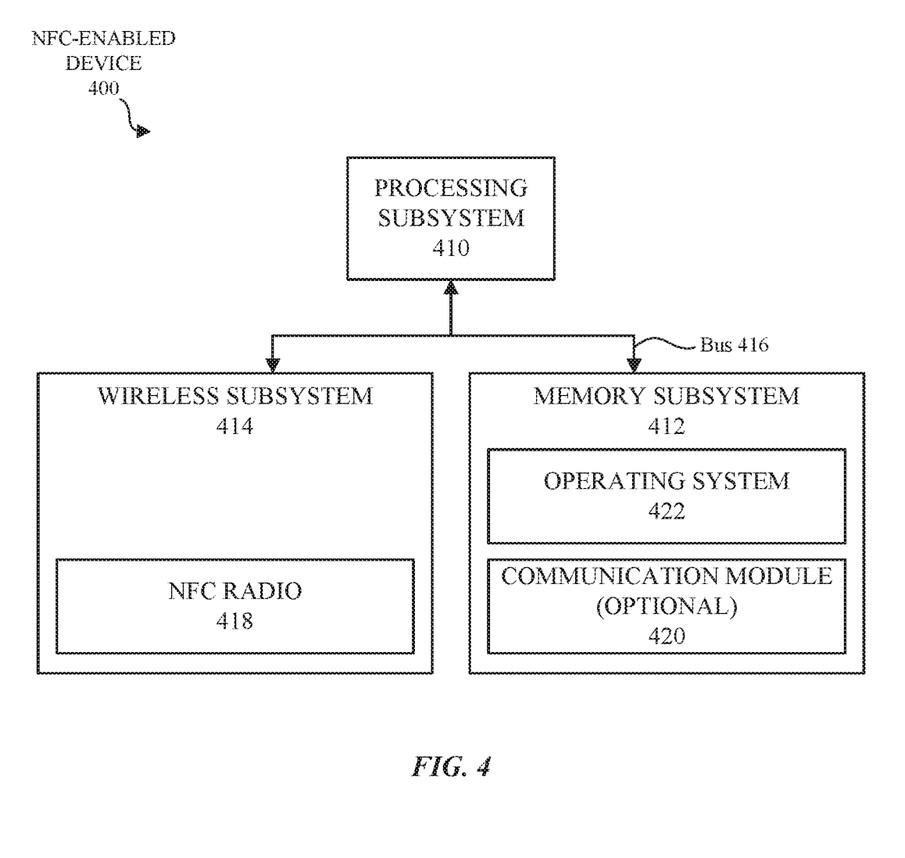
FIG. 4 illustrates a block diagram of an exemplary NFC-enabled device, according to some embodiments.

After initiating second timer 210, the applet may then wait to see if another command is issued by reader 120. If reader 120 issues a third command 212 before second timer 210 expires (as shown in FIG. 2), then second timer 210 is canceled and a third timer 214 is initiated. If, however, reader 120 does not issue another command before second timer 210 expires (not shown in FIG. 2), then the applet may assume that the transaction is complete and may present a corresponding indication to the user once second timer 210 expires. Additionally, the applet may instruct the application processor to deactivate the NFC interface and/or the NFC radio of NFC-enabled device 110 upon expiration of second timer 210.

Moreover, in some embodiments, the NFC interface and/or the NFC radio may be deactivated if, for example, reader 120 has turned off its radio frequency (RF) field. Additionally, or alternatively, the applet may wait to instruct the NFC-enabled device's application processor to deactivate the NFC interface and/or the NFC radio until after reader 120 has turned off its RF field or until after a user of NFC-enabled device 110 has removed device 110 from the reader 120's RF field. In such cases, commands that may not have been able to be completed prior to the expiration of second timer 210 may be completed before the NFC interface and/or the NFC radio are deactivated.

In some embodiments, third timer 214 may be set to have the same value as either first timer 206 or second timer 210. Alternatively, in some embodiments, third timer 214 may be set to have a different value than first and second timers 206 and 210. For example, third timer 214 may be set based on the type of command and/or the type of data associated with third command 212. As discussed above, third command 212 may represent a second read command instructing NFC-enabled device 110 to retrieve the user's new transit account balance for verification purposes. Accordingly, third timer 214 (which is associated with a relatively less processor-intensive read command) may be set to a relatively lower value than second timer 210 (which is associated with a relatively more processor-intensive write command).

After initiating third timer 214, the applet may then wait to see if another command is issued by reader 120. If reader 120 does not issue another command before third timer 214 expires (as shown in FIG. 2), then the applet may assume that the transaction is complete, and may issue an activity timeout signal 216 to the application processor. Upon receipt of activity timeout signal 216, the application processor may then provide the user with an indication that the transaction has been completed. Additionally, the applet may instruct the application processor to deactivate the NFC interface and/or the NFC radio of NFC-enabled device 110 upon expiration of third timer 214.

In some embodiments where reader 120 issues fewer than three commands, then the applet may issue activity timeout signal 216 at an earlier point in time, such as at a time that closely follows the expiration of first timer 206 or second timer 210.

As described above, implementation of command-based timer solution 200 may help reduce unnecessary delays and/or incomplete transactions that may be caused by NFC-enabled devices being unable to provide a timely and accurate indication that a desired transaction has been completed.

Although first, second, and third commands 204, 206, and 208 are discussed as being read or write commands, command-based timer solution 200 is not limited to these types of commands. Instead, as will become apparent to those skilled in the relevant art(s), other types of commands, including, but not limited to, encryption/decryption commands and authentication commands (e.g., user authentication, device authentication, expiration date authentication, and/or account activation authentication) are possible without departing from the spirit and scope of the present disclosure.

Figure 3:
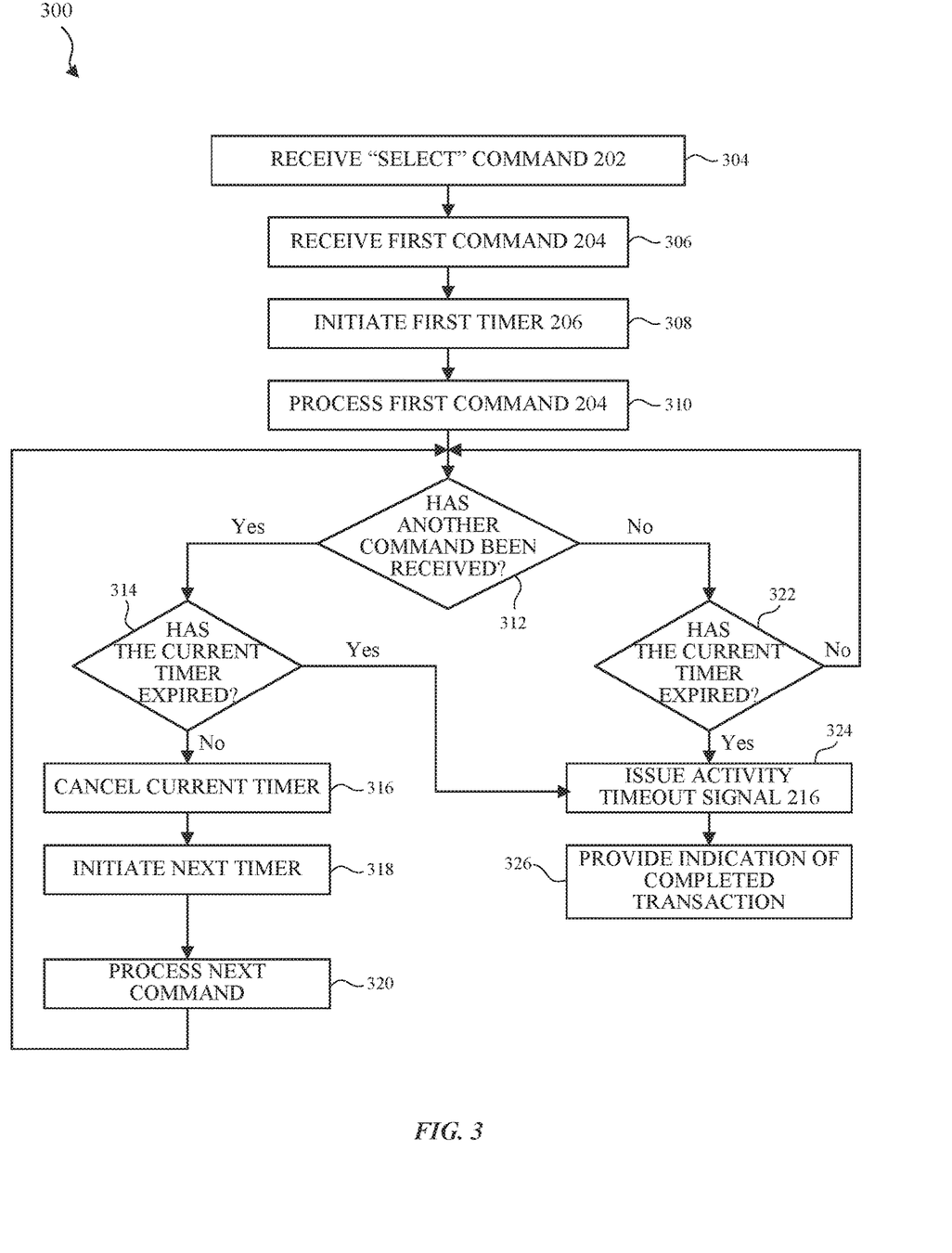
FIG. 3 illustrates an example flowchart for a command-based timer solution within an NFC-enabled device, according to some embodiments.

FIG. 3 illustrates an example flowchart 300 for a command-based timer solution within an NFC-enabled device according some embodiments. This disclosure is not limited to this operational description. Rather, it will be apparent to persons skilled in the relevant art(s) from the teachings herein that other operational control flows are within the spirit and scope of the present disclosure. The following discussion describes the operations in FIG. 3. For illustrative purposes, the flowchart 300 of FIG. 3 is described with reference to embodiments of FIGS. 1 and 2. However, flowchart 300 is not limited to these embodiments. It is to be appreciated that not all operations may be needed to perform the disclosure provided herein. Further, some of the operations may be performed simultaneously or in a different order than shown in FIG. 3.

Flowchart 300 begins with operation 304, where in response to NFC-enabled device 110 being positioned proximate to reader 120, NFC-enabled device 110 may receive a "select" command 202 from reader 120. Select command 202 may instruct an applet installed on NFC-enabled device 110 to begin processing of the mobile transaction. Once the applet begins, NFC-enabled device 110 is ready to detect and process commands issued by reader 120 during the course of the transaction.

In operation 306, NFC-enabled device 110 may receive a first command 204 from reader 120. As discussed above, first command 204 may represent a first read command instructing NFC-enabled device 110 to retrieve transit account balance.

In operation 308, the applet installed on NFC-enabled device 110 may initiate a first timer 206. First timer 206 may have any number of different values. For example, first timer 206 may represent a default timer. Alternatively, first timer 206 may vary based on the type of command and/or the type of data associated with first command 204. In some embodiments, first timer 206 may also include a certain amount of "buffer" time in addition to the length of time that it may take for NFC-enabled device 110 and reader 120 to perform the processing needed to complete first command 204. The buffer time added to first timer 206 may help ensure that premature transaction completion indications are not presented, which may also help ensure that the user does not inadvertently move NFC-enabled device 110 out of near field range of reader 120 before the transaction is completed.

In operation 310, the applet installed on NFC-enabled device 110 may process first command 204 issued by reader 120. For example, the applet may retrieve the transit account balance from a memory (shown in FIG. 4) in response to first command 204. Additionally, the applet may provide the retrieved information to an application processor (shown in FIG. 4) of NFC-enabled device 110 such that the information can be modulated and communicated back to reader 120. In some embodiments, the applet may also instruct the application processor to perform certain other functions that may be associated with first command 204, such as data encryption/decryption and authentication. In some embodiments, operation 310 may occur before operation 308.

In operation 312, a determination is made as to whether NFC-enabled device 110 has received a second command 208 from reader 120. If it is determined that NFC-enabled device 110 has received second command 208 from reader 120, in operation 314, a second determination is made as to whether first timer 206 has expired. If it is determined that first timer 206 has not expired, in operation 316, the applet installed on NFC-enabled device 110 cancels first timer 206. And in operation 318, the applet initiates second timer 210. The order of the first timer cancellation and second timer initiation can be varied or they can be performed substantially simultaneously.

In some embodiments, second timer 210 may have the same value as first timer 206. Alternatively, second timer 210 may have a different value than first timer 206. For example, second timer 210 may be set based on the type of command and/or the type of data associated with second command 208. As discussed above, second command 208 may represent a write command instructing NFC-enabled device 110 to write a new transit account balance to memory in place of the old transit account balance.

In operation 320, the applet installed on NFC-enabled device 110 may process second command 208 issued by reader 120. The applet may write a new transit account balance to memory in place of the old transit account balance in response to second command 208. Once the applet has completed the processes associated with second command 208, the operational control flow returns to operation 312 where NFC-enabled device 110 determines whether a third command 212 has been received from reader 120. In some embodiments, operation 320 may occur before operation 316 and/or operation 318.

If, however, it is determined in operation 312 that another command has not been received from reader 120 (e.g., second command 208, third command 212, etc.), then the operational control flow proceeds to operation 322. In operation 322, another determination is made as to whether the current timer (e.g., first timer 206, second timer 210, third timer 214, etc.) has expired. If it is determined in operation 322 that the current timer has not expired, then the operational control flow returns to operation 312 where NFC-enabled device 110 determines whether another command has been received from reader 120.

If however, it is determined in operation 322 that the current timer has expired, then the operational control flow proceeds to operation 324. In operation 324, the applet installed on NFC-enabled device 110 may assume that the transaction is complete and may issue an activity timeout signal 216 to the application processor.

Similarly, if it is determined in operation 314 that the current timer has expired, then the operational control flow also proceeds to operation 324, where the applet may issue an activity timeout signal 216 to the application processor.

In operation 326, the application processor may provide an indication that the transaction has been completed. In some embodiments, the indication of a completed transaction may be provided as a visual indication on the display of NFC-enabled device 110, an audio indication produced by NFC-enabled device 110's speakers, and/or a vibration indication using NFC-enabled device 110's vibration functionality, to provide some examples.

Flowchart 300 therefore helps reduce unnecessary delays and/or incomplete transactions that may be caused by NFC-enabled devices being unable to provide a timely and accurate indication that a desired transaction has completed.

FIG. 4 illustrates a block diagram of an exemplary NFC-enabled device 400, according to some embodiments. NFC-enabled device 400 may represent an exemplary embodiment of NFC-enabled device 110. NFC-enabled device 400 may include a processing subsystem 410, a memory subsystem 412, and a wireless subsystem 414.

Processing subsystem 410 may include or operate with one or more devices or components that perform computational operations. For example, processing subsystem 410 can include one or more microprocessors, baseband processors, application processors, application-specific integrated circuits (ASICs), microcontrollers, and/or programmable-logic devices. Processing subsystem 410 may also include an applet, which may be responsible for processing read/write commands issued by reader 120. Moreover, processing subsystem 410 may execute an operating system 422 (stored in memory subsystem 412) that includes procedures (or a set of instructions) for handling various basic system services for performing hardware-dependent tasks.

Memory subsystem 412 may include one or more devices for storing data and/or instructions for processing subsystem 410 and wireless subsystem 414. For example, memory subsystem 412 can include dynamic random access memory (DRAM), static random access memory (SRAM), and/or other types of memory. Memory subsystem 412 may include volatile memory and/or non-volatile memory that are configured to store information. In addition, memory subsystem 412 can include mechanisms for controlling access to the memory. In some embodiments, memory subsystem 412 includes a memory hierarchy with one or more caches coupled to a memory in NFC-enabled device 400. Additionally or alternatively, one or more of the caches may be located in processing subsystem 410.

Moreover, memory subsystem 412 may be coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by NFC-enabled device 400 as fast-access storage for often-used data, while the mass-storage device may be used to store less frequently used data.

Wireless subsystem 414 may include processors, controllers, radios/antennas, sockets/plugs, and/or other devices used for engaging in wireless communication with another wireless communication device or a reader/terminal. As discussed previously, those skilled in the relevant art(s) will recognize that NFC-enabled device 400 may be configured to communicate using near-field communication (NFC) technology, such that one or more commands and/or data can be exchanged when NFC-enabled device 400 and a reader/terminal are sufficiently proximate to each other. However, those skilled in the relevant art(s) will recognize that NFC-enabled device 400 may be configured to communicate using other wireless communication protocols (either near field or far field communications) without departing from the spirit and scope of the present disclosure. For example, although the present disclosure is described using NFC-enabled devices, those skilled in the relevant art(s) will recognize that certain functions of NFC-enabled device 400 may be performed using other communication protocols, such as Wi-Fi, Bluetooth, radio-frequency identification (RFID), cellular communication, or the like. Therefore, wireless subsystem 414 may be configured to enable communication with another wireless communication device or a reader/terminal via any one of these wireless protocols. The mechanisms used for coupling to, communicating on, and handling data and events on the wireless link may be referred to collectively as an "interface" or "wireless interface" herein.

Within NFC-enabled device 400, processing subsystem 410, memory subsystem 412, and wireless subsystem 414 may be coupled together using bus 416. Bus 416 may be an electrical, optical, or electro-optical connection that the subsystems can use to communicate commands and data among one another. Although NFC-enabled device 400 is shown with only one bus 416, a different number or configuration of electrical, optical, or electro-optical connections among the subsystems is possible without departing from the spirit and scope of the present disclosure.

Similarly, NFC-enabled device 400 may be implemented as a standalone device, a discrete device, or may be incorporated within or coupled to another electrical device or host device, which include, for example, (i) a cellphone, (ii) a smartwatch, (iii) a portable computing device, (iv) a camera, (v) a Global Positioning System (GPS) unit, (vi) another computing device such as a personal digital assistant, a video gaming device, a laptop, a tablet, or a portable audio and/or video player, and/or (vii) any other suitable electronic device that will be apparent to those skilled in the relevant art(s) without departing from the spirit and scope of the present disclosure.

In some embodiments, NFC-enabled device 400 may include one or more additional processing subsystems 410, memory subsystems 412, and/or wireless subsystems 414. Additionally, it may be possible for one or more of these subsystems to be omitted from NFC-enabled device 400. Moreover, NFC-enabled device 400 may include one or more additional subsystems that are not shown in FIG. 4. For example, NFC-enabled device 400 can include, but is not limited to: a display subsystem for displaying information, a data collection subsystem, an audio and/or video subsystem, an alarm subsystem, a media processing subsystem, and/or an input/output (I/O) subsystem. Also, although separate subsystems are shown in FIG. 4, some or all of a given subsystem can be integrated into one or more of the other subsystems in NFC-enabled device 400 and/or positions of components in NFC-enabled device 400 can be changed without departing from the spirit and scope of the present invention.

Now turning back to wireless subsystem 414. As illustrated in FIG. 4, wireless subsystem 414 may include an NFC radio 418, which may include hardware and/or software mechanisms that can be used for transmitting and receiving wireless signals to and from another wireless communication device or reader/terminal. In some embodiments, NFC radio 418 may be responsible for processing near-field communications, embodiments of which were discussed above with respect to FIGS. 1-3. Although wireless subsystem 414 is described as having only one radio, those skilled in the relevant art(s) will recognize that additional radios could also be included, such as a Wi-Fi radio or a cellular radio, to provide some examples.

In some embodiments, wireless communication between NFC-enabled device 400 and other wirelessly-enabled devices, and/or readers/terminals, may be implemented using low-level hardware, such as in a physical layer, a link layer, and/or a network layer in a network architecture. For example, wireless communication may, at least in part, be implemented in a media access control layer. However, in other embodiments at least some of the wireless communication operations are performed by one or more programs, modules, or sets of instructions (such as optional communication module 420 stored in memory subsystem 412), which may be executed by processing subsystem 410. The one or more programs may constitute a computer-program mechanism. Furthermore, instructions in the various modules in memory subsystem 412 may be implemented in a high-level procedural language, an object-oriented programming language, and/or an assembly or machine language. Note that the programming language may be compiled or interpreted, e.g., configurable or configured, to be executed by processing subsystem 410.

As discussed above, NFC-enabled device 400 may represent an exemplary embodiment of NFC-enabled device 110. In such scenarios, processing subsystem 410 may be configured to perform at least the following functions associated with the command-based timer solutions illustrated in FIGS. 2 and 3: processing "select" command 202 received from reader 120; initiating first, second, and third timers 206, 210, and 214; processing first, second, and third commands 204, 208, and 212 received from reader 120; canceling a current timer in response to receiving another command from reader 120; issuing activity timeout signal 216; providing the user with an indication that the transaction has been completed; activating/deactivating NFC radio 418; and analyzing the timing behavior of reader 120 to determine appropriate timer values.

Moreover, wireless subsystem 414 may be configured to perform at least the following functions associated with the command-based timer solutions illustrated in FIGS. 2 and 3: receiving "select" command 202 from reader 120; receiving first, second, and third commands 204, 208, and 212 from reader 120; communicating information back to reader 120 in response to first, second, and third commands 204, 208, and 212; and scanning the wireless environment to detect the length of time between commands being issued by reader 120.

The procedures (or set(s) of instructions) for performing the aforementioned functions may be included in operating system 422 stored in memory subsystem 412. Additionally, memory subsystem 412 may be configured to store various other forms of information that are used during the command-based timer solutions illustrated in FIGS. 2 and 3, such as one or more timer value look up tables, encryption/decryption keys, user authentication information, device authentication information, and user transit account information, to provide some examples.

In some embodiments, a tangible, non-transitory apparatus or article of manufacture comprising a tangible computer useable or readable medium having control logic (software) stored thereon is also referred to herein as a computer program product or program storage device. This includes, but is not limited to, processing subsystem 410, memory subsystem 412, operating system 422, and communication module 420, as well as tangible articles of manufacture embodying any combination of the foregoing. Such control logic, when executed by one or more data processing devices (such as processing subsystem 410), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 4. In particular, embodiments may operate with software, hardware, and/or operating system implementations other than those described herein.

Additionally, embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others. Further, firmware, software, routines, instructions may be described herein as performing certain actions. However, it should be appreciated that such descriptions are merely for convenience and that such actions result from computing devices, processors, controllers, or other devices executing the firmware, software, routines, instructions, etc.

It is to be appreciated that the Detailed Description section, and not any other section, is intended to be used to interpret the claims. Other sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, in a wirelessly-enabled device, for processing a payment transaction, comprising:
    executing an applet on the wirelessly-enabled device, wherein the applet communicates via near-field communication (NFC);
    receiving, by the wirelessly-enabled device, a first command and a second command from a credit card reader;
    detecting a command type of the first command;
    setting a duration of a first command-based timer based at least in part on the detected command type of the first command and a type of data associated with the first command;
    setting a duration of a second command-based timer based at least in part on a type of data associated with the second command, wherein the type of data associated with the second command is different from the type of data associated with the first command, and wherein the second command-based timer is different from the first command-based timer;
    initiating the first command-based timer in response to receiving the first command from the credit card reader, wherein the first command-based timer represents an allotment of time that the wirelessly-enabled device waits before providing a visual indication that the payment transaction has been completed;
    issuing an activity timeout signal upon determining that the first command-based timer has expired before the second command is received from the credit card reader; and
    providing, by the wirelessly-enabled device, the visual indication that the payment transaction has been completed when the activity timeout signal has been issued.

2. The method of claim 1, further comprising:
    canceling the first command-based timer when the second command is received before the first command-based timer has expired;
    initiating the second command-based timer in response to receiving the second command before the first command-based timer has expired;
    determining whether a third command is received before the second command-based timer expires; and
    issuing, by the applet, the activity timeout signal when the second command-based timer has expired before the third command is received.

3. The method of claim 2, further comprising storing information correlating the first and second commands with one or more timer values in a table associated with the applet.

4. The method of claim 2, wherein the initiating the second command-based timer comprises setting the duration of the second command-based timer based at least in part on a command type of the second command.

5. The method of claim 1, wherein the indication that the payment transaction has been completed comprises at least one of a visual indication, an audio indication, or a haptic indication.

6. The method of claim 1, further comprising deactivating, in response to the activity timeout signal, at least one of an NFC interface or an NFC radio included in the wirelessly-enabled device.

7. The method of claim 1, wherein each of the first and second command-based timers includes a predetermined amount of buffer time.

8. The method of claim 1, wherein the first command is a read command instructing the wirelessly-enabled device to retrieve first user data from memory included in the wirelessly-enabled device.

9. The method of claim 8, wherein the second command is a write command instructing the wirelessly-enabled device to write second user data in place of the first user data within the memory included in the wirelessly-enabled device.

10. The method of claim 1, further comprising receiving, by the wirelessly-enabled device, a select command from the credit card reader that instructs the applet to begin processing the first and second commands, wherein the select command is received before the first command is received.

11. The method of claim 1, wherein the command type of the first command includes at least one of a read command, a memory address indicator, a write command, a data encryption command, a device authentication command, or a user authentication command.

12. The method of claim 1, wherein the type of data associated with the first command includes at least one of an amount of data associated with the first command, or an encryption status of the data associated with the first command.

13. A near-field communication enabled (NFC-enabled) device, comprising:
    an NFC interface configured to receive a first command and a second command from an NFC reader, wherein the first command is associated with an NFC transaction;
    an applet configured to:
    detect a command type of the first command;
    set a duration of a first command-based timer based at least in part on the detected command type of the first command and a type of data associated with the first command;
    set a duration of a second command-based timer based at least in part on a type of data associated with the second command, wherein the type of data associated with the second command is different from the type of data associated with the first command, and wherein the second command-based timer is different from the first command-based timer;
    initiate the first command-based timer in response to receiving the first command from the NFC reader, wherein the first command-based timer represents an allotment of time that the NFC-enabled device waits before providing a visual indication that the NFC transaction has been completed;
    issue an activity timeout signal upon determining that the first command-based timer has expired before the second command is received from the NFC reader; and
    an application processor configured to provide the visual indication that the NFC transaction has been completed when the activity timeout signal has been issued.

14. The NFC-enabled device of claim 13, wherein the applet is further configured to:
- cancel the first command-based timer when the second command is received before the first command-based timer has expired;
- initiate the second command-based timer;
- determine whether a third command is received before the second command-based timer expires; and
- issue the activity timeout signal when the second command-based timer has expired before the third command is received.

15. The NFC-enabled device of claim 14, wherein each of the first and second commands comprises at least one of a read command, a write command, an encryption command, a decryption command, an electronic wallet update command, or an authentication command.

16. The NFC-enabled device of claim 14, wherein the applet comprises a table that stores information correlating the first and second commands with one or more timer values.

17. The NFC-enabled device of claim 13, wherein the NFC interface is further configured to receive the first and second commands from the NFC reader.

18. The NFC-enabled device of claim 17, wherein the NFC interface is further configured to receive the first command based at least in part on the NFC-enabled device being positioned within a near field range of the NFC reader.

\* \* \* \* \*